(12) United States Patent
Akiyama et al.

(10) Patent No.: US 8,006,548 B2
(45) Date of Patent: Aug. 30, 2011

(54) ENGINE BENCH SYSTEM CONTROL SYSTEM

(75) Inventors: Takao Akiyama, Takasaki (JP); Yoshimasa Sawada, Konosu (JP); Masayasu Kanke, Kumagaya (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 12/742,383

(22) PCT Filed: Nov. 18, 2008

(86) PCT No.: PCT/JP2008/070906
§ 371 (c)(1),
(2), (4) Date: May 11, 2010

(87) PCT Pub. No.: WO2009/069503
PCT Pub. Date: Jun. 4, 2009

(65) Prior Publication Data
US 2010/0251811 A1 Oct. 7, 2010

(30) Foreign Application Priority Data
Nov. 30, 2007 (JP) ................................ 2007-309981

(51) Int. Cl.
*G01M 15/00* (2006.01)
(52) U.S. Cl. .................................................. 73/116.05
(58) Field of Classification Search ............... 73/114.15, 73/114.25, 116.05
See application file for complete search history.

(56) References Cited

U.S. PATENT DOCUMENTS

| | | | | |
|---|---|---|---|---|
| 5,078,008 A * | 1/1992 | Yagi et al. | ................. | 73/116.05 |
| 5,631,411 A * | 5/1997 | Harms et al. | ................. | 73/114.15 |
| 6,434,454 B1 * | 8/2002 | Suzuki | ............................. | 701/29 |
| 6,768,940 B2 | 7/2004 | Akiyama et al. | | |
| 6,775,610 B2 * | 8/2004 | Akiyama et al. | .............. | 701/114 |
| 7,610,799 B2 * | 11/2009 | Sugita | ......................... | 73/114.15 |
| 7,770,440 B2 * | 8/2010 | Langthaler et al. | ........ | 73/115.05 |

FOREIGN PATENT DOCUMENTS

| | | |
|---|---|---|
| JP | 2000-39380 A | 2/2000 |
| JP | 2003-121307 A | 4/2003 |
| JP | 2003-207424 A | 7/2003 |
| JP | 3775284 B2 | 3/2006 |
| JP | 2006-300684 A | 11/2006 |

* cited by examiner

*Primary Examiner* — Freddie Kirkland, III
(74) *Attorney, Agent, or Firm* — Foley & Lardner LLP

(57) ABSTRACT

It is a challenge to make it possible to produce a resonance suppression effect, and perform a stable control even in a case where a spring rigidity of a shaft significantly varies. The challenge is achieved as follows. In an engine bench system in which an engine 1 to be tested and a dynamometer 2 are coupled together by a coupling shaft 3, and a shaft torque control of the dynamometer is performed, a controller 5 includes: an integral element having an integral coefficient $K_I$ for a deviation (T12r−T12) between a shaft torque command T12r and a measured shaft torque T12; a differential element having a differential coefficient $K_D$ for the measured shaft torque T12; and a proportional element $K_P$ for the measured shaft torque T12. The controller 5 obtains a torque control signal T2 by subtracting the differential element and the proportional element from the integral element. Control parameters ($K_I$, $K_P$, $K_D$, $f_1$) are determined according to control characteristic parameters (a4, a3, a2, a1) set in a function calculation section 6, inertia moments J1, J2 of the engine and the dynamometer, and spring rigidity K12 of the coupling shaft.

20 Claims, 14 Drawing Sheets

ENGINE BENCH SYSTEM CONTROL SYSTEM

TECHNICAL FIELD

The present invention relates to an engine bench system control system in which an engine to be tested is directly coupled to a dynamometer as a power absorber, and various kinds of characteristics of the engine are measured, and particularly relates to a torque control for the dynamometer.

BACKGROUND ART

FIG. 13 shows an engine bench system. In FIG. 13, an engine E/G is combined with a transmission T/M (AT or MT with a clutch) which is connected with dynamometer DY via a coupling shaft. Engine E/G is provided with a throttle actuator ACT for controlling throttle opening.

On the other hand, dynamometer DY is provided with a revolution detector PP and a torque detector (a load cell) LC. The speed or torque of dynamometer DY are controlled on a basis of detection signals of the detectors. This control is implemented by a PID control with a controller (a dynamometer controller) C(s). FIG. 13 shows a case of torque control, where controller C(s) performs a PID-calculation of a deviation between a setting torque input and a measured torque of dynamometer DY at a calculation section, and performs a torque control of dynamometer DY by controlling an output of an inverter INV on a basis of the calculation result.

In the engine bench system that performs the PID control of the dynamometer, the engine may generate a pulsating torque, which may cause the coupling shaft to destroy due to resonance. There is a control system to prevent this resonance destruction, in which the dynamometer is PID-controlled while a resonance point of a mechanical system constituted by the engine, the coupling shaft, and the dynamometer is set to a frequency equal to or lower than the pulsating torque generated by the engine. However, it is very difficult to perform the speed control or shaft torque control with a high-speed response, if the resonance point of the mechanical system is set to be equal to or lower than the engine pulsating torque frequency.

The Applicant has already proposed a shaft torque control system using a μ design method which is one of robust control design theories, which is a stable and high-speed shaft torque control system for an engine bench system where resonance of the shaft is suppressed (for example, refer to patent documents 1 and 2). According to the μ design method, a magnitude of each perturbation of a real system can be expressed in terms of a structural singular value μ. In patent document 1, the magnitude of each perturbation is determined to satisfy robust stability and robust performance conditions during the design of a controller, and is incorporated into the controller to constitute a transfer function of the controller.
Patent Document 1: Japanese Patent No. 3775284.
Patent Document 2: Japanese Patent Application Publication No. 2003-121307.

DISCLOSURE OF THE INVENTION

The shaft torque control system using the μ design method generally requires two operations, i.e. (1) modeling of a controlled object, and (2) determination of a weight function. The determination of a weight function requires trial and error.

The method proposed in patent document 2 ensures a some degree of robustness with respect to fluctuations in spring rigidity of a shaft. However, in a case where the spring rigidity significantly varies, for example, from about 100 Nm/rad to about 3000 Nm/rad, it is difficult to achieve a stable torque control based on the μ design method.

It is an object of the present invention to provide an engine bench system control system which can provide a resonance suppression effect, and can perform a stable control even in a case where the spring rigidity of a shaft significantly varies.

The following describes a principle of a control system according to the present invention. In general, a mechanical system of an engine bench system is expressed as a multi-inertia (two or more inertia) mechanical system model. The present invention is targeted for an engine bench system which can be approximated to a two-inertia system. FIG. 14 shows a mechanical system model. In this model, it is assumed that a dynamometer is directly coupled with an engine via a coupling shaft.

Where the physical quantity of each component of a mechanical system model shown in FIG. 14 is represented as: J1: an engine inertia moment; J2: a dynamometer inertia moment; K12: a spring rigidity of the coupling shaft; T12: a torsional torque of the coupling shaft (shaft torque); ω1: an engine angular velocity; ω2: dynamometer angular velocity; and T2: a dynamometer torque, a motion equation of the engine bench system is expressed with a Laplace operator s by the following equations (1) through (3).

$$J1 \times s \times \omega 1 = T12 \tag{1}$$

$$T12 = (K12/s) \times (\omega 2 - \omega 1) \tag{2}$$

$$J3 \times s \times \omega 2 = -T12 + T2 \tag{3}$$

In the present invention, a shaft torque command value (a command value of T12) is represented as T12r, and the dynamometer torque T2 is controlled on a basis of a transfer function expressed by the following equation (4). This equation (4) includes: an integral element having an integral coefficient $K_I$ for integral calculation of a deviation (T12r−T12) between the shaft torque command T12r and the measured shaft torque T12; a differential element having a differential coefficient $K_D$ for differential calculation of the measured shaft torque T12 with a first-order delay (time constant $f_1$); and a proportional element $K_p$ for proportional calculation of the measured shaft torque T12 with a first-order delay (time constant $f_1$). The equation obtains a torque control signal T2 by subtracting the differential element and the proportional element from the integral element.

$$T2 = \frac{K_I}{s}(T12r - T12) - \frac{K_D s + K_P}{f_1 s + 1} T12 \tag{4}$$

When the controlled object expressed by the motion equations of (1) through (3) is controlled according to equation (4), its closed loop characteristic polynomial equation is a fourth-order polynomial equation whose coefficients can be arbitrarily set with four parameters of ($K_I$, $K_P$, $K_D$, $f_1$). The closed loop characteristic polynomial equation of equation (1) through (4) is expressed by the following equation (5).

$$P(s) = a4 \times (s/\omega_r)^4 + a3 \times (s/\omega_r)^3 + a2 \times (s/\omega_r)^2 + a1 \times (s/\omega_r) + 1 \tag{5}$$
$$\text{wherein } \omega_r = \sqrt{(K12 \times (1/J1 + 1/J2))}.$$

Coefficients ($K_I$, $K_P$, $K_D$, $f_1$) can be defined by comparison between coefficients of the closed loop characteristic polynomial of equations (1) through (4) and coefficients of equation (5). In this way, control parameters ($K_I$, $K_P$, $K_D$, $f_1$) of equation (4) can be determined from estimated controlled object parameters (J1, K12, J2) and control characteristic parameters (a4, a3, a2, a1). This relationship is expressed in the form of a function f(a4, a3, a2, a1, J1, K12, and J2) as shown in the following equations (6) through (9).

$$K_I = fK_I(a4,a3,a2,a1,J1,K12,J2) \quad (6)$$

$$K_P = fK_P(a4,a3,a2,a1,J1,K12,J2) \quad (7)$$

$$K_D = fK_D(a4,a3,a2,a1,J1,K12,J2) \quad (8)$$

$$K_1 = fK_1(a4,a3,a2,a1,J1,K12,J2) \quad (9)$$

In this way, the present invention is implemented by: expressing an engine bench system as a two-inertia mechanical system model; obtaining a fourth-order polynomial as a closed-loop characteristic polynomial of the motion equations of this mechanical system model and the transfer function of a controller; and arbitrarily setting or determining each coefficient of the transfer function of the controller by four parameters ($K_I$, $K_P$, $K_D$, $f_1$), thus obtaining control gains which provide a resonance suppression effect where it is made unnecessary to adjust the weight function conventionally.

There is no possibility that estimated controlled object parameters (J1, K12, J2) which are used in equations (6) through (9) are completely identical to physical parameters of an actual system. However, according to the present invention, it is possible to achieve a stable control even in a case where the spring rigidity K12r of the actual system is compared with K12 used in equations (6) through (9) to find K12r>>K12.

In view of the foregoing, the present invention is featured by the following control systems.

(1) An engine bench system control system for an engine bench system in which an engine to be tested and a dynamometer are coupled together by a coupling shaft, and various kinds of characteristics of the engine are measured through a shaft torque control of the dynamometer, the engine bench system control system comprising: a controller that performs the shaft torque control of the dynamometer on a basis of a shaft torque command T12r and a measured shaft torque T12 of the dynamometer, with a transfer function expressed by the following equation, $$T2 = \frac{K_I}{s}(T12r - T12) - \frac{K_D s + K_P}{f_1 s + 1} T12,$$

wherein $K_I$, $K_D$, $K_P$, and $f_1$ denote parameters, and s denotes a Laplace operator.

(2) The engine bench system control system further comprising a function calculation section that determines the parameters ($K_I$, $K_D$, $K_P$, and $f_1$) on a basis of estimated controlled object parameters (J1, K12, J2) and set control characteristic parameters (a4, a3, a2, a1), using with the following equation:

$$K_I = fK_I(a4,a3,a2,a1,J1,K12,J2)$$

$$K_P = fK_p(a4,a3,a2,a1,J1,K12,J2)$$

$$K_D = fK_D(a4,a3,a2,a1,J1,K12,J2) \text{ and}$$

$$K_1 = fK_1(a4,a3,a2,a1,J1,K12,J2),$$

wherein J1 denotes an engine inertia moment, J2 denotes a dynamometer inertia moment, and K12 denotes a spring rigidity of the coupling shaft.

(3) The engine bench system control system further comprising a parameter setter that sets the control characteristic parameters (a4, a3, a2, and a1) to a binomial coefficient type or Butterworth type.

(4) The engine bench system control system as claimed in claim 1 or 2, further comprising a parameter calculation section that sets the control characteristic parameters (a4, a3, a2, and a1) to coefficients of a product of a characteristic polynomial of a two inertia mechanical system having a resonance characteristic and a characteristic polynomial of a second-order low pass filter.

(5) The engine bench system control system further comprising a parameter calculation section that sets the control characteristic parameters (a4, a3, a2, and a1) to coefficients of a product of a characteristic polynomial of a two inertia system having a resonance characteristic A and a characteristic polynomial of a two inertia system having a resonance characteristic B.

(6) The engine bench system control system further comprising a spring rigidity calculation section that sets a spring rigidity K12 into the function calculation section, wherein the spring rigidity K12 is calculated using the following equation with reference to an engine inertia moment J1, a dynamometer inertia moment J2, and a resonance frequency $\omega_c$ that is obtained from a T2f table that stores data about a system resonance frequency that varies in accordance with a magnitude of the shaft torque command T12r, $$K12 = J1 \times J2 \times \omega_c^2 / (J1+J2).$$

(7) The engine bench system control system further comprising a spring rigidity calculation section that sets a spring rigidity K12 into the function calculation section, wherein the spring rigidity K12 is calculated using the following equation with reference to an engine inertia moment J1, a dynamometer inertia moment J2, and a resonance frequency $\omega_c$ that is obtained from a T2f table that stores data about a system resonance frequency that varies in accordance with a magnitude of the measured shaft torque T12, $$K12 = J1 \times J2 \times \omega_c^2 / (J1+J2).$$

(8) The engine bench system control system further comprising a spring rigidity calculation section that sets a spring rigidity K12 into the function calculation section, wherein the spring rigidity K12 is calculated using the following equation with reference to an engine inertia moment J1, a dynamometer inertia moment J2, and a resonance frequency $\omega_c$ that is obtained from a T2f table that stores data about a system resonance frequency that varies in accordance with a magnitude of a sum of the shaft torque command T12r and a measured value that is obtained by applying the measured shaft torque T12 with a high pass filter, $$K12 = J1 \times J2 \times \omega_c^2 / (J1+J2).$$

(9) The engine bench system control system further comprising a scale multiplier that multiplies by a gain K (0<K<=1) the resonance frequency derived from the T2f table, and inputs the multiplied resonance frequency into the spring rigidity calculation section.

BEST MODE FOR CARRYING OUT THE INVENTION

Embodiment 1

Figure 1:
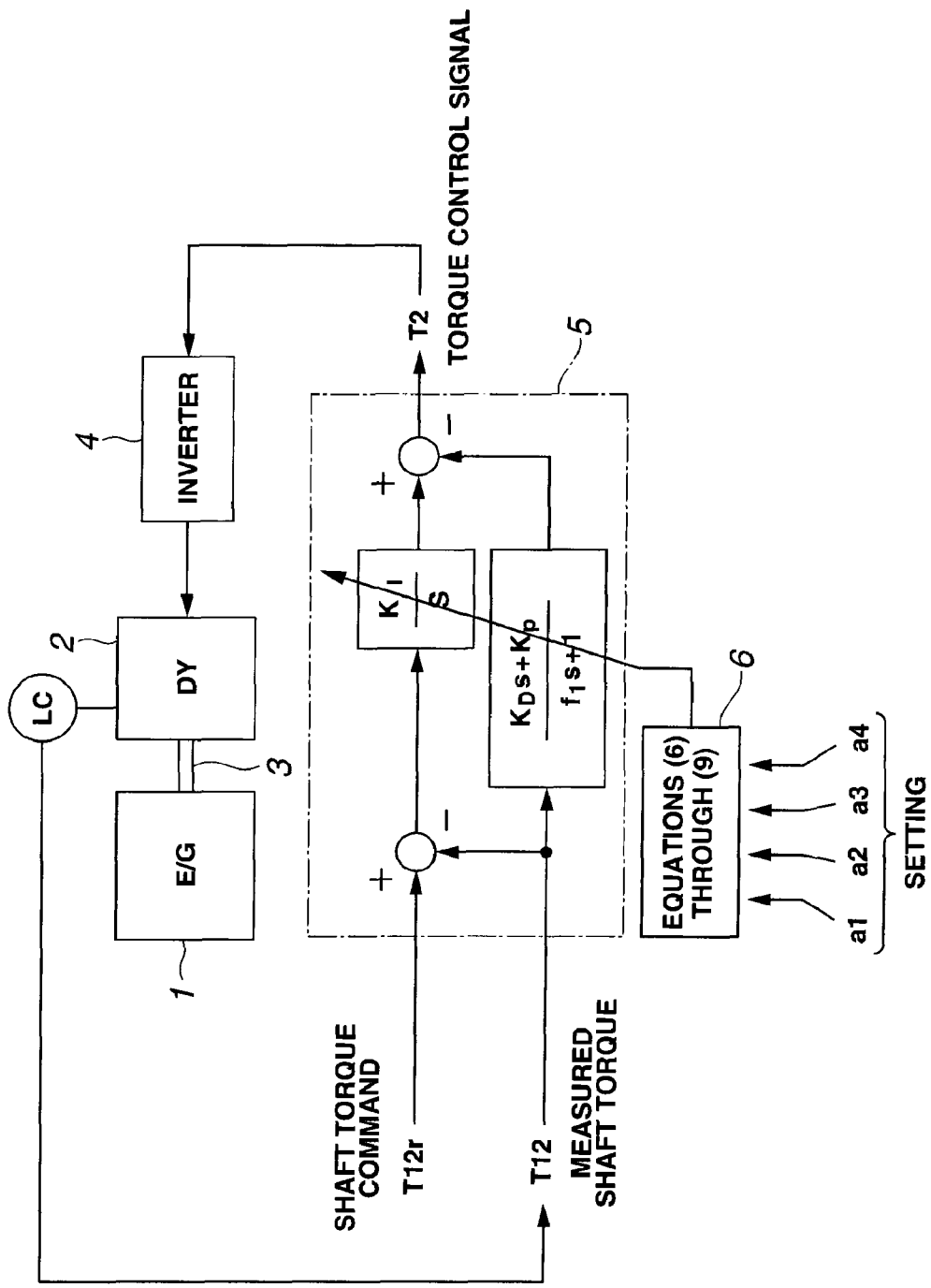
FIG. 1 is a control circuit block diagram of a major part of a dynamometer, showing a first embodiment of the present invention.

FIG. 1 shows a control circuit of a major part of a dynamometer in an engine bench system according to the present embodiment. In a system configuration where an engine 1 is coupled to a dynamometer 2 via a shaft 3, and an inverter 4 controls an output of engine 1 and a torque of dynamometer 2, a controller 5 generates a torque control signal T2 for dynamometer 2 by calculation based on a shaft torque command T12r and a measured shaft torque T12 with a transfer function of the above equation (4).

Control parameters ($K_I$, $K_P$, $K_D$, $f_1$) in controller 5 are determined by calculation according to the above equations (6) through (9) on a basis of control characteristic parameters (a4, a3, a2, a1) set in a function calculation section 6 and estimated controlled object parameters (J1, K12, J2).

In this embodiment, the coefficients ($K_I$, $K_P$, $K_D$, $f_1$) of equation (4) are determined as follows.

Control characteristic parameters (a4, a3, a2, a1) are prepared by a parameter setter. For example, to set them to a binomial coefficient type, control parameters are set as a4=1, a3=4, a2=6, and a=4. To set them to a Butterworth type, control parameters are set as a4=1, a3=2.61312592975275, a2=3.41421356237309, a1=2.61312592975275.

This embodiment is implemented by directly determining control gains according to equations (6) through (9) from the two-inertia system parameters J1, K12, J2. Accordingly, it is not necessary to adjust a weight function conventionally, and it is possible to easily find control gains that provide a resonance suppression effect.

Figure 2:
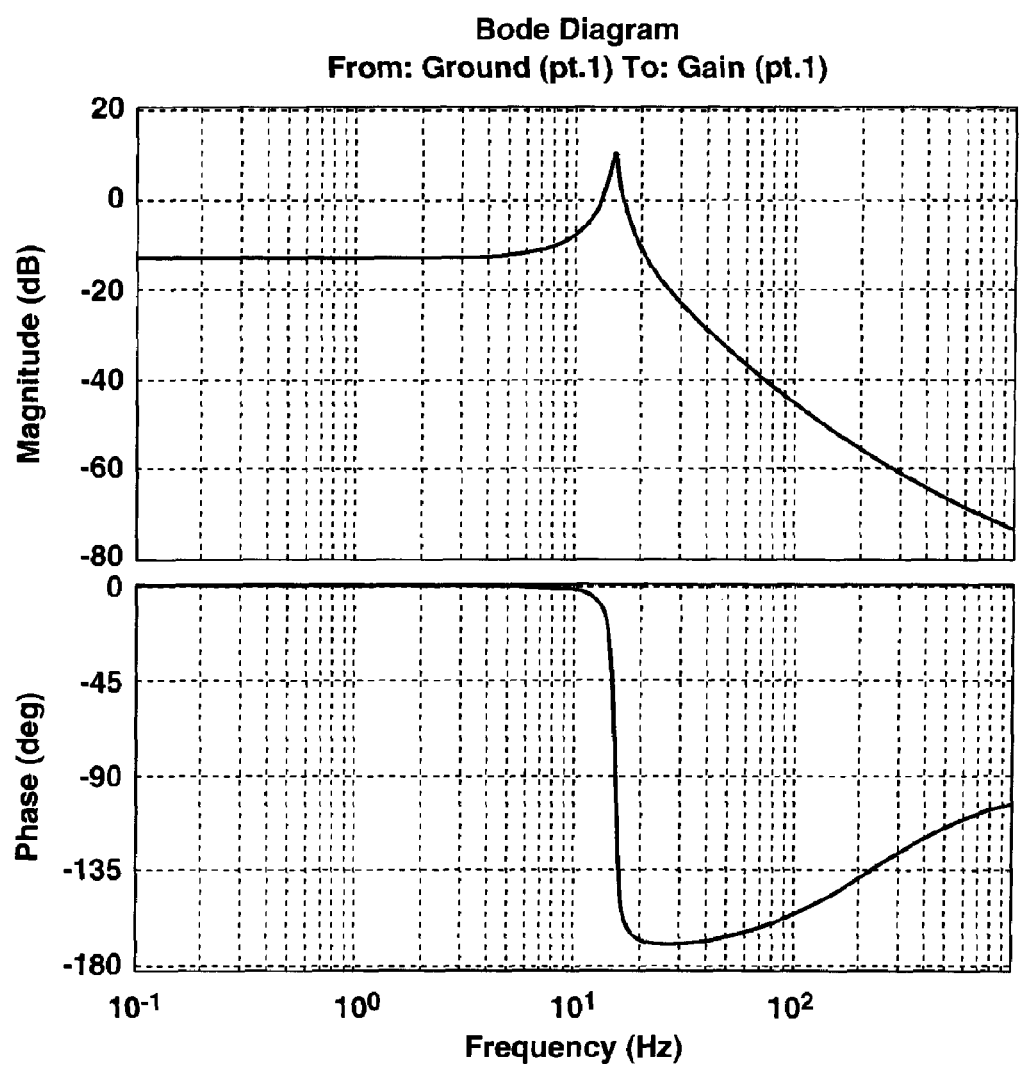
FIG. 2 is an example of characteristics of an engine bench system.

FIG. 2 shows an example of characteristics of the engine bench system shown in FIG. 1. FIG. 2 shows a Bode diagram from T2 to T12 in a case where J1=0.2, K12=1500, and J2=0.7. As shown in FIG. 2, the engine bench system has a resonance point at a certain frequency (about 15 Hz in FIG. 2), and has a steady-state gain (a gain in a low frequency range) from dynamometer torque control signal T2 to measured shaft torque T12 which is different from 0 dB (about −13 dB in FIG. 2).

Figure 3:
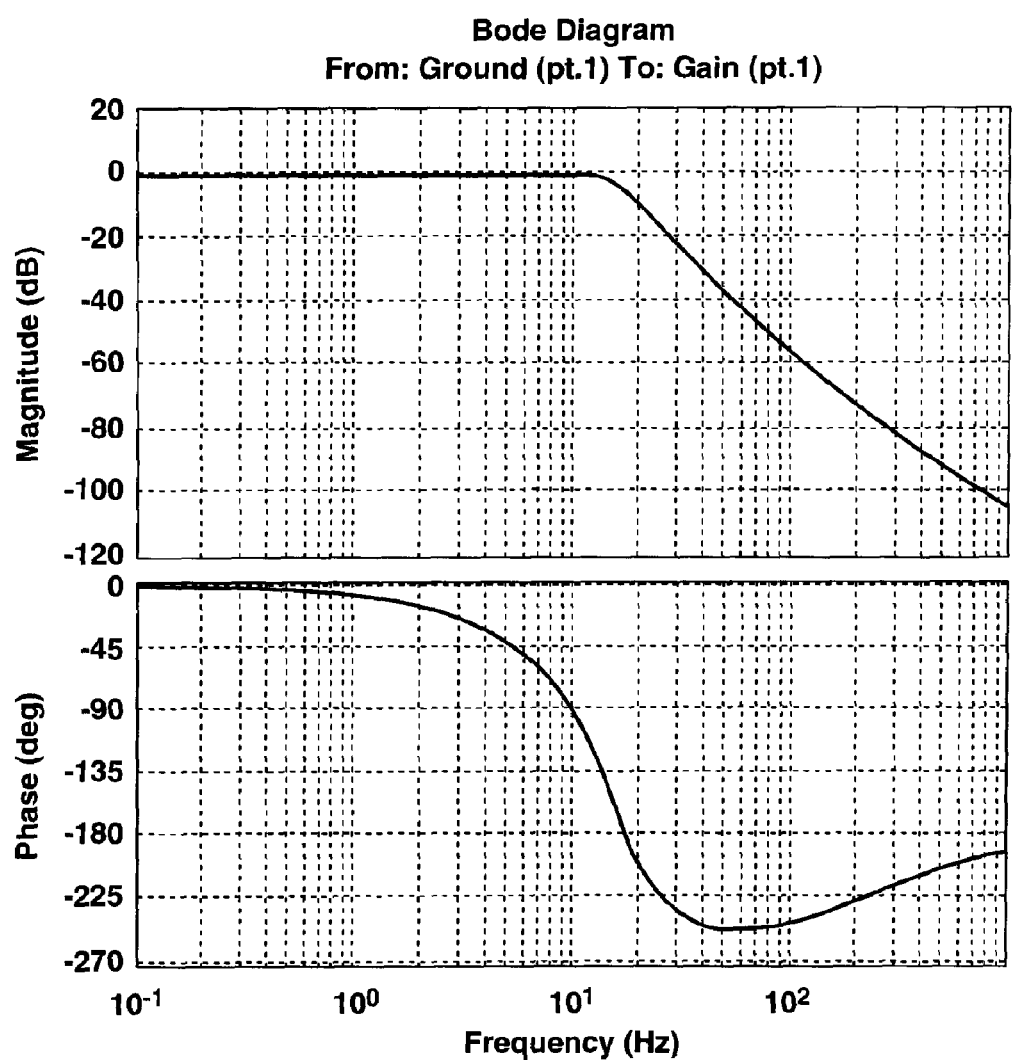
FIG. 3 is a characteristic diagram of shaft torque control according to the first embodiment.

FIG. 3 shows a Bode diagram from shaft torque command value T12r to measured shaft torque T12 in a case where the control characteristic parameters (a4, a3, a2, a1) are set to the above Butterworth type values, and the coefficients ($K_I$, $K_P$, $K_D$, $f_1$) calculated by equations (6) through (9) are substituted into equation (4).

In this way, according to the present embodiment, the resonance is suppressed and control is performed for the steady-state gain to be 0 dB. In addition, it is unnecessary to adjust a weight function conventionally, and it is possible to easily find control gains that provide a resonance suppression effect.

Figure 4:
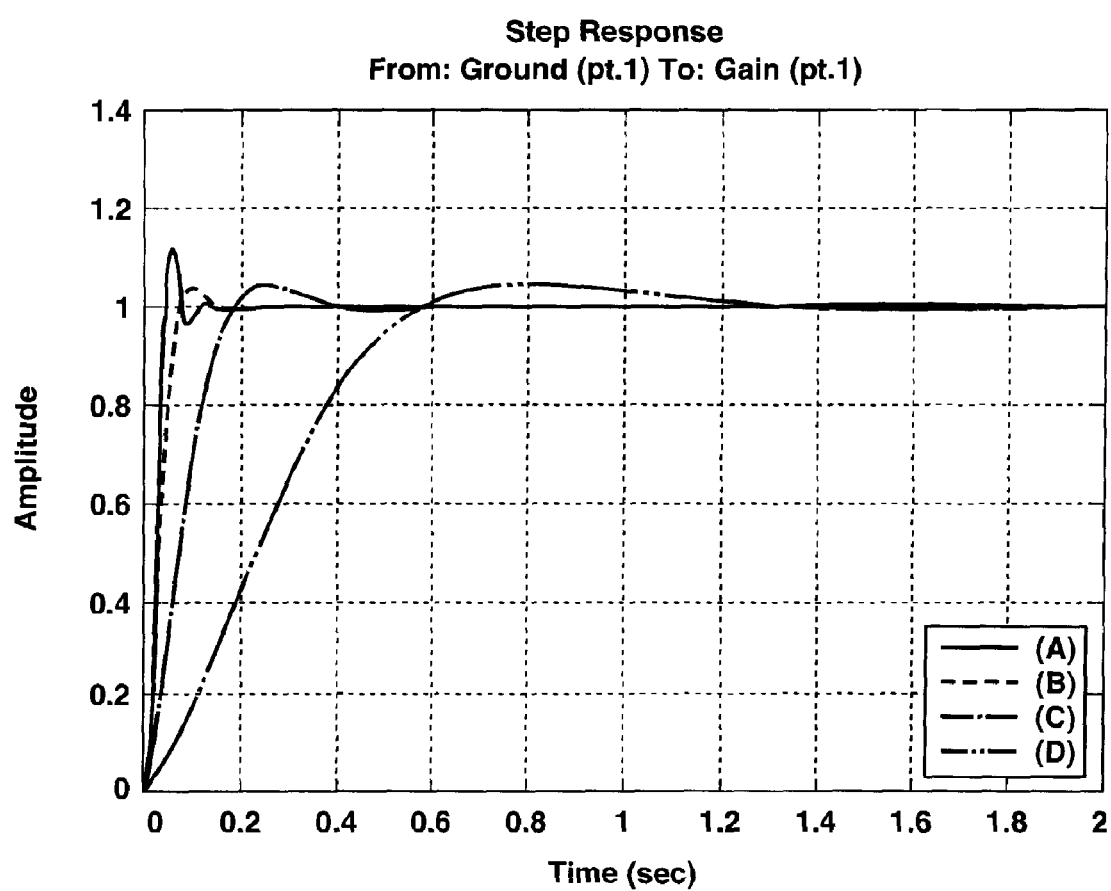
FIG. 4 is a step response characteristic diagram according to the first embodiment.

FIG. 4 shows another example of an effect achieved by the present embodiment. FIG. 4 shows an example of a step response from shaft torque command value T12r to measured shaft torque T12 in a case where K12 in equations (6) through (9) to determine the control gains in equation (4) are set as (A): K12=1500, (B): K12=750, (C): K12=150, and (D): K12=15, when K12=1500 in the actual mechanical system.

According to this embodiment, it is possible to achieve a stable control, although response is adversely affected, in a case where the spring rigidity of the actual mechanical system is higher than the value which is assumed for equations (6) to (9) for calculation of control gains.

Embodiment 2

Figure 5:
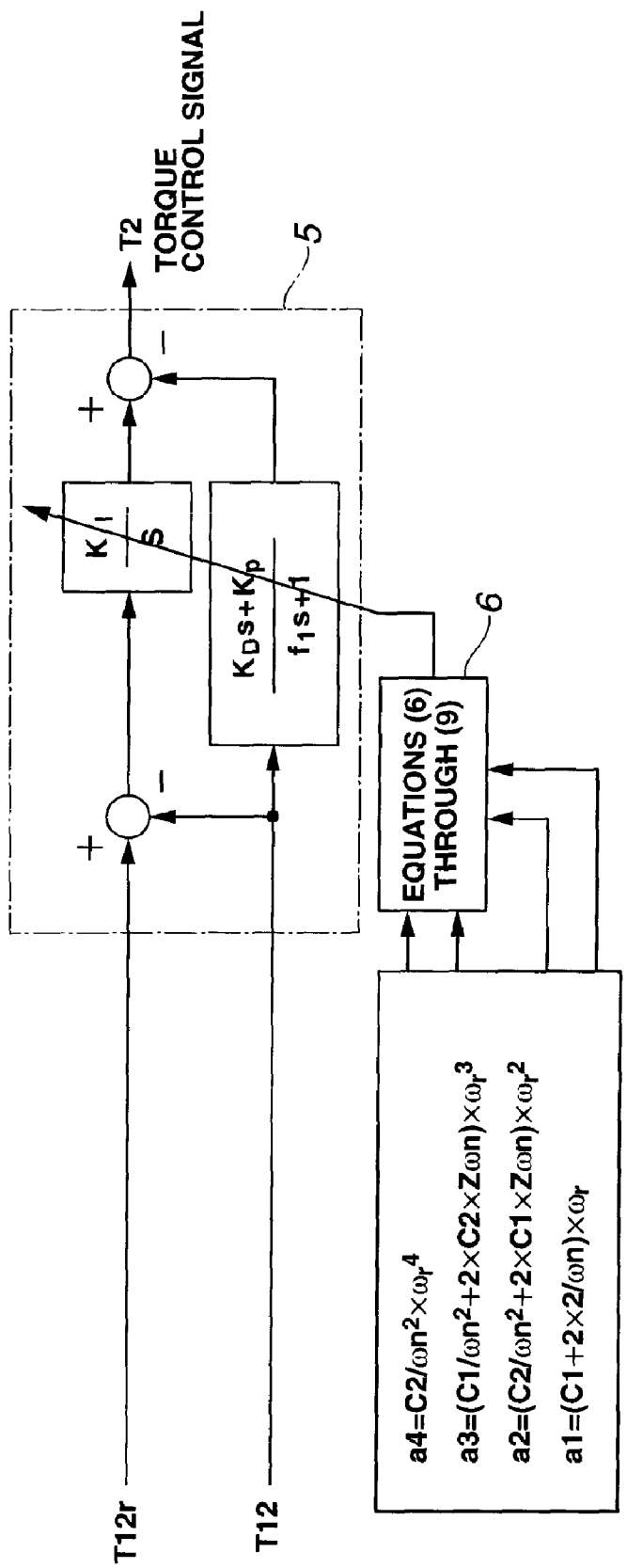
FIG. 5 is a control circuit block diagram of a major part of a dynamometer, showing a second embodiment of the present invention.

FIG. 5 shows a control circuit of a major part of a dynamometer according to the present embodiment, in which the mechanical system is omitted. In this embodiment, a parameter calculation section 7 is provided which determines parameters of ($K_I$, $K_P$, $K_D$, $f_1$) in equation (4) as described below.

Parameter calculation section 7 sets control characteristic parameters (a4, a3, a2, a1) to coefficients of a product of a characteristic polynomial of a two-inertia mechanical system having a resonance characteristic and a characteristic polynomial of a second-order low-pass filter. Specifically, the control characteristic parameters are set as follows.

When a resonance frequency and a damping coefficient of a two-inertia mechanical system having a desired resonance characteristic are represented by ωn, and z, respectively, its characteristic polynomial is $(s/\omega n)^2 + 2 \times z \times (s/\omega n) + 1$. In addition, the characteristic polynomial of the second-order low pass filter is assumed as $c2 \times s^2 + c1 \times s + 1$. Their product is $((s/\omega n)^2 + 2 \times z \times (s/\omega n) + 1) \times (c2 \times S2 + c1 \times s + 1))$. This yields $a4 = c2/\omega n^2 \times \omega r^4$, $a3 = (c1/\omega n^2 + 2 \times c2 \times z/\omega n) \times \omega r^3$, $a2 = (c2 + 1/\omega n^2 + 2 \times c1 \times z/\omega n) \times \omega r^2$, and $a1 = (c1 + 2 \times z/\omega n) \times \omega r$, wherein $\omega r = \sqrt{(K12 \times (1/J1 + 1/J2))}$.

The control characteristic parameters (a4, a3, a2, a1) calculated in this way are set at function calculation section 6, to determine control parameters ($K_I$, $K_P$, $K_D$, $f_I$) in equation (4) according to equations (6) through (9).

Figure 6:
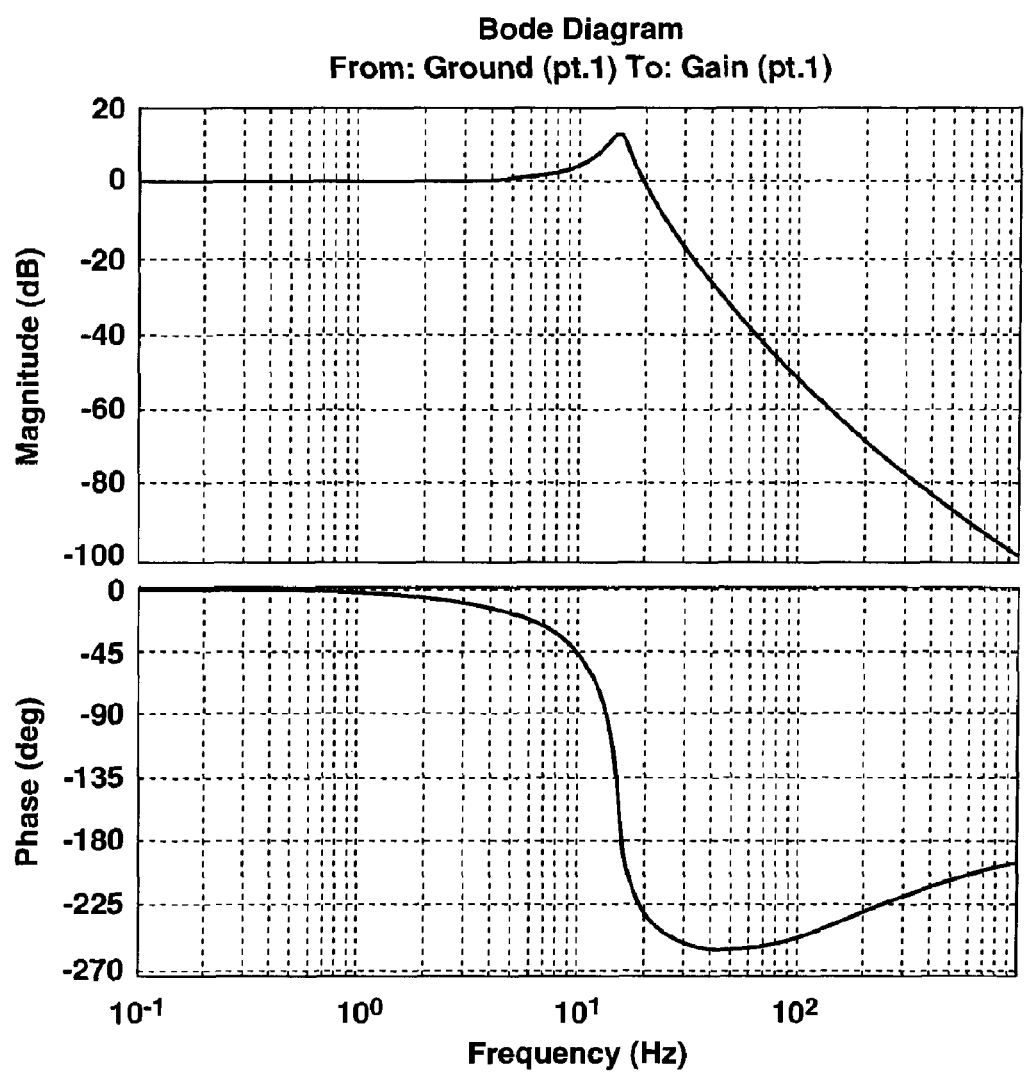
FIG. 6 is a characteristic diagram of shaft torque control according to the second embodiment.

FIG. 6 shows a case of the present embodiment in which the low pass filter characteristic is of the Butterworth type, the mechanical resonance frequency characteristic is the mechanical resonance frequency characteristic of the controlled object, and the damping factor z is set to 0.1. Specifically, FIG. 6 shows a Bode diagram from the shaft torque command value (T12r) to the measured shaft torque (T12) in a case where control parameters ($K_I$, $K_P$, $K_D$, $f_1$) calculated by equations (6) through (9) are substituted into equation (4), with c2=1, c1=1.41421356237309, ωn=ωr, and z=0.1.

In this way, control can be carried out with a desired resonance characteristic and 0 dB steady-state gain. According to this embodiment, it is possible to achieve a stable control, even in a case where the spring rigidity of the actual mechanical system is higher than the value which is assumed for equations (6) to (9) for calculation of control gains, as in the first embodiment shown in FIG. 4.

Embodiment 3

Figure 7:
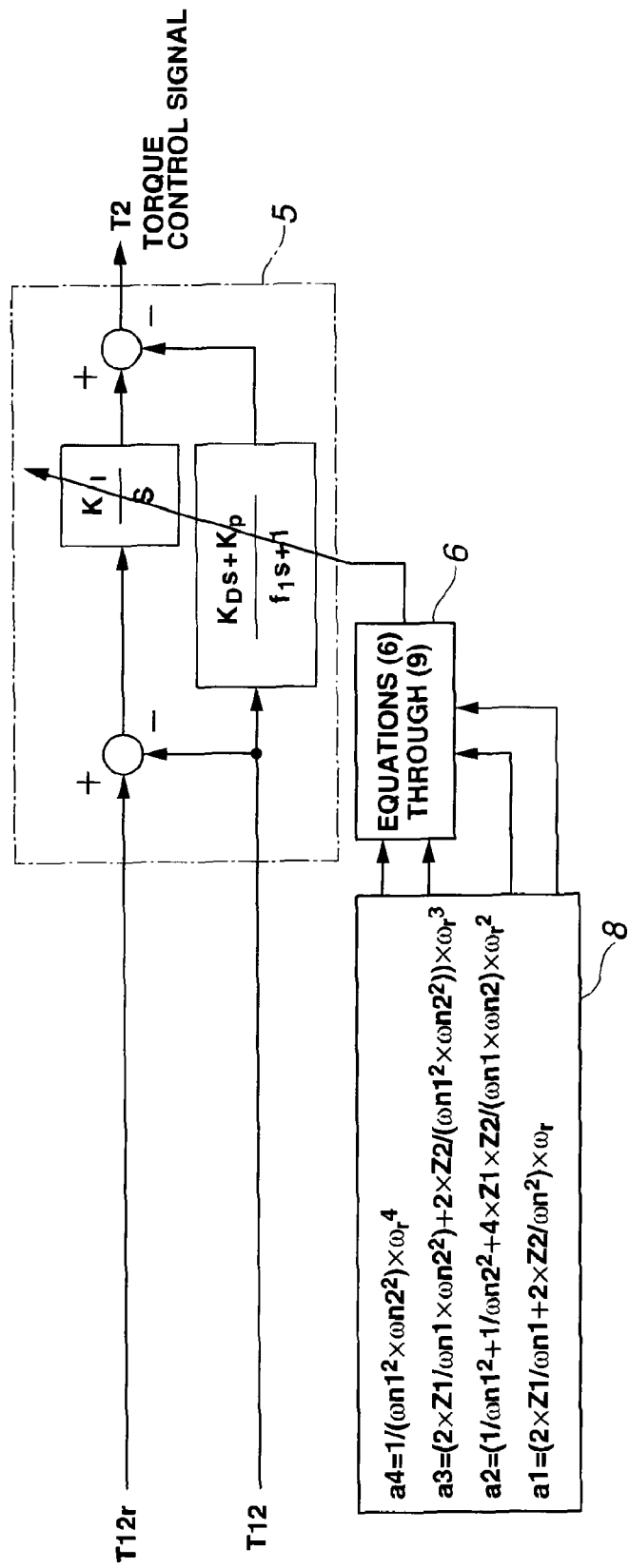
FIG. 7 is a control circuit block diagram of a major part of a dynamometer, showing a third embodiment of the present invention.

FIG. 7 shows a control circuit block diagram of a major part of a dynamometer according to the present embodiment, in which the mechanical system is omitted. In this embodiment, a parameter calculation section 8 is provided to determine control parameters of ($K_I$, $K_P$, $K_D$, $f_1$) in equation (4) as follows.

Parameter calculation section 8 sets control characteristic parameters (a4, a3, a2, a1) to coefficients of a product of the characteristic polynomial of a two-inertia system having a resonance characteristic A and the characteristic polynomial of a two-inertia system having a resonance characteristic B.

Specifically, control characteristics are set as follows. When the resonance characteristic A is represented by a resonance frequency ωn1 [rad/a], and a damping coefficient z1, and the resonance characteristic B is represented by a resonance frequency of ωn2 [rad/a], and a damping coefficient z2, the product of these characteristic polynomials is $((s/\omega n1)^2+2 \times z1 \times(s/\omega n1)+1) \times ((s/\omega n2)^2+2 \times z2 \times(s/\omega n2)+1)$. This yields, $a4=1/(\omega n1^2 \times \omega n2^2) \times \omega r^4$ $a3=(2 \times z1/(\omega n1^2 \times \omega n2^2)+2 \times z2/(\omega n2^2 \times \omega n2)) \times \omega r^3$ $a2=(1/\omega n1^2+1/\omega n2^2+4 \times z1 \times z2/(\omega n1 \times \omega n2)) \times \omega r^2$ $a1=(2 \times z1/\omega n1+2 \times z2/\omega n2) \times \omega r$.

The control characteristic parameters (a4, a3, a2, a1) calculated in this way are set in function calculation section 6 and control parameters ($K_I$, $K_P$, $K_D$, $f_1$) of equation (4) are determined according to equations (6) through (9).

Figure 8:
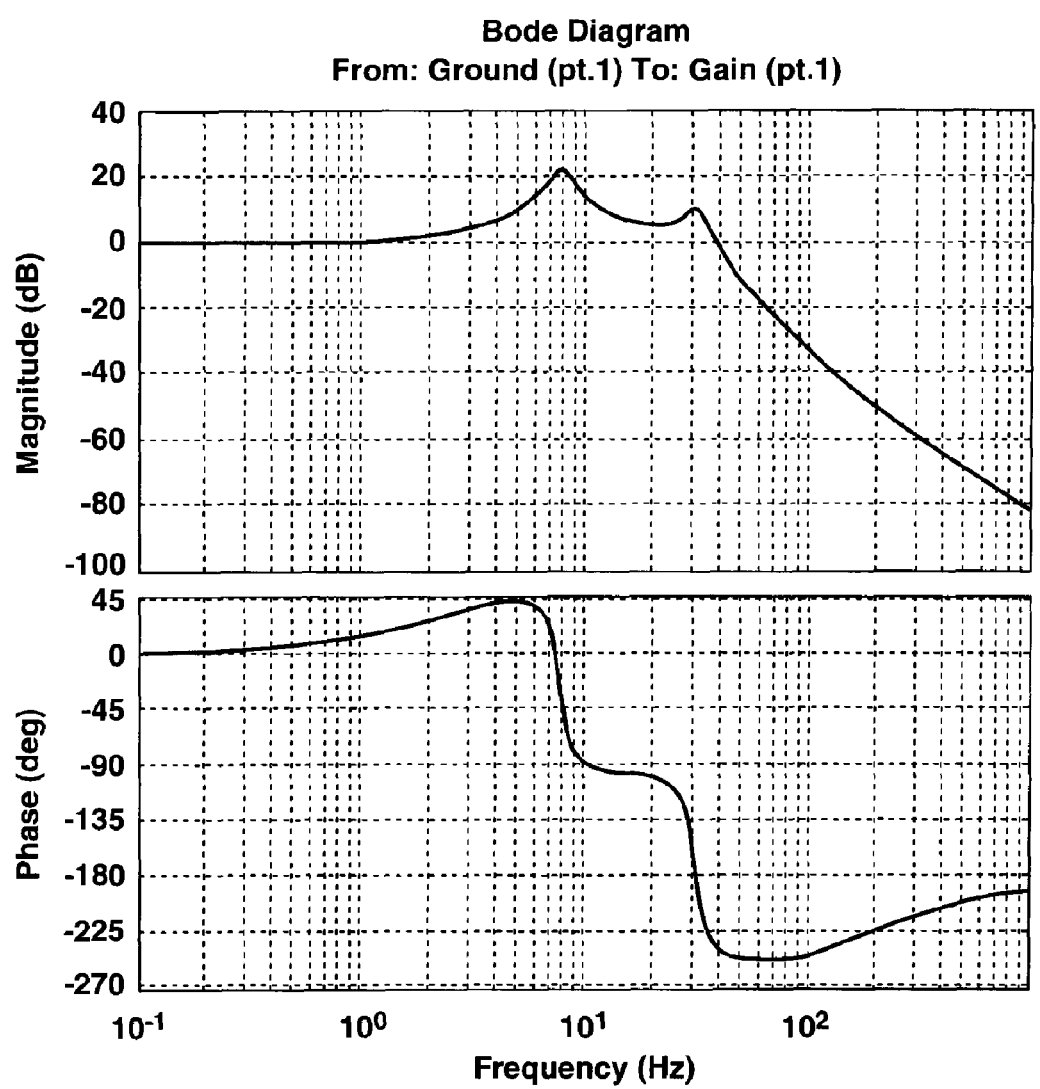
FIG. 8 is a characteristic diagram of shaft torque control according to the third embodiment.

FIG. 8 shows a case of the present embodiment where the resonance characteristic A is set to 0.5 times the mechanical resonance frequency of the controlled object, a damping factor of 0.1, and the resonance characteristic B is set to twice the mechanical resonance frequency of the controlled object, and a damping factor z of 0.1. Specifically, FIG. 8 shows a Bode diagram from the shaft torque command value (T12r) to the measured shaft torque (T12), in a case where ($K_I$, $K_P$, $K_D$, $f_1$) calculated in equations (6) through (9) are substituted into equation (4), with ωn1=ωr×0.5, z1=0.1, ωn2=ωr×2, and z2=0.1.

In this way, according to the third embodiment, the mechanical system of the controlled object having only a single resonance characteristic can be controlled as if it had two resonance characteristics, with a steady-state gain of 0 dB. Moreover, according to this embodiment, it is possible to achieve a stable control, even in a case where the spring rigidity of the actual mechanical system is higher than the value which is assumed for equations (6) to (9) for calculation of control gains, as in the first embodiment shown in FIG. 8.

Embodiment 4

Figure 9:
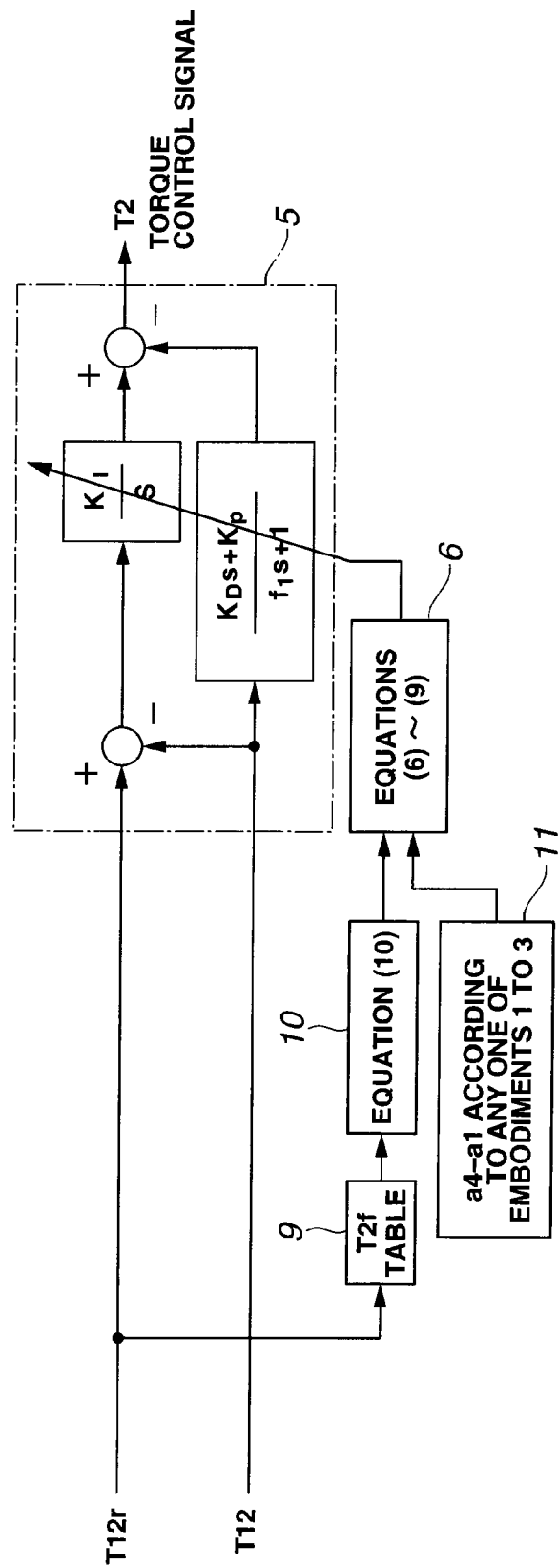
FIG. 9 is a control circuit block diagram of a major part of a dynamometer, showing a fourth embodiment of the present invention.

FIG. 9 shows a control circuit of a major part of a dynamometer according to the present embodiment, in which the mechanical system is omitted. In this embodiment, ($K_I$, $K_P$, $K_D$, $f_1$) in equation (4) are determined by a calculation element described below.

Figure 14:
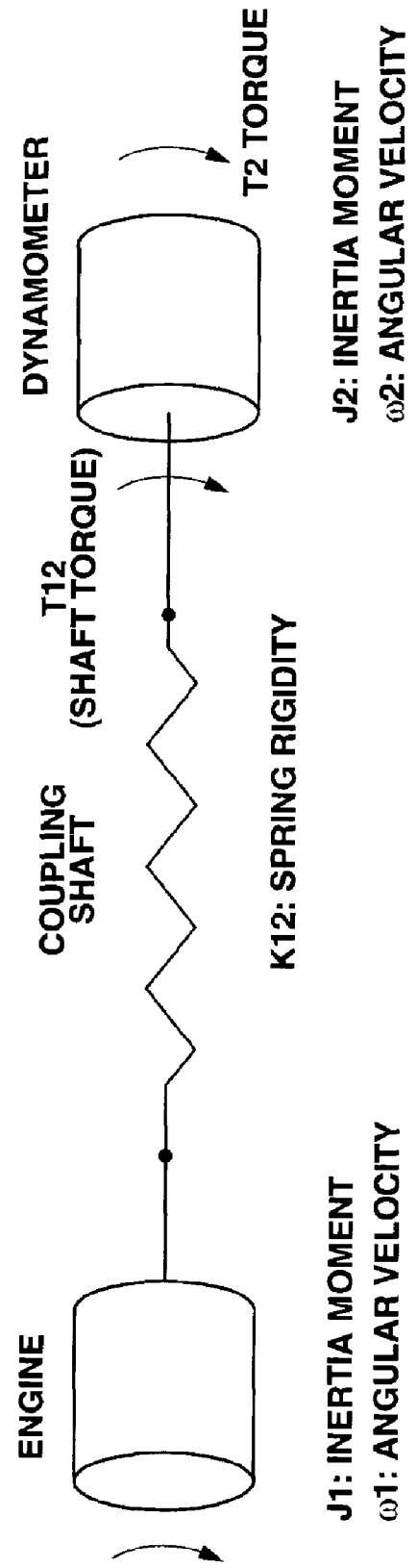
FIG. 14 is a diagram showing a mechanical system model of the engine bench system.

The fourth embodiment is applicable to a mechanical system whose resonance frequency varies according to the magnitude of a shaft torque (in which the spring has a non-linear characteristic). In a case where the coupling shaft shown in FIG. 14 is provided with a nonlinear spring (a spring whose spring rigidity varies according to a torsional angle of the spring) such as a clutch, a shaft torque control system is constructed as follows.

A some means is used to prepare a table (T2f table) 9 which stores data about a relationship between the magnitude of the torsional torque (shaft torque command) of the system shown in FIG. 1 and the resonance frequency that varies according to the torsional torque. The means may be implemented by calculation for cases where the characteristic of the nonlinear spring is given, or measurement of the resonance frequency at the moment the torsional torque is equal to a certain value.

A spring rigidity calculation section 10 determines the spring rigidity K12 for the resonance frequency $\omega_c$ [rad/s] derived from the T2f table 9, by calculation using the following equation (10), on a basis of the engine inertia moment J1 and dynamometer inertia moment J2 which are prepared by some means. J1 and J2 may be calculated from design values of parts or may be measured by some means.

$$K12=J1 \times J2 \times \omega_c^2/(J1+J2) \qquad (10)$$

A parameter calculation section 11 is provided in any one of the parameter calculation sections of the first through third embodiments, setting the control characteristic parameters (a4, a3, a2, a1).

Function calculation section 6 determines the control parameters ($K_I$, $K_P$, $K_D$, $f_1$) from the spring rigidity K12 and control characteristic parameters (a4, a3, a2, a1), and controls torque control signal T2 according to equation (4).

In this embodiment, an input signal to the T2f table is used as the shaft torque command value (T12r) to determine the spring rigidity K12 of the actual system. Even in a system whose resonance frequency varies in accordance with the magnitude of the shaft torque in the Bode diagram shown in FIG. 2, the gain parameters ($K_I$, $K_P$, $K_D$, $f_1$) in equation (4) are determined by the configuration of FIG. 9 constantly in conformance with the resonance frequency. Accordingly, the same effects as in first through third embodiments can be obtained, even for a non-linear engine bench system whose resonance frequency varies.

Embodiment 5

Figure 10:
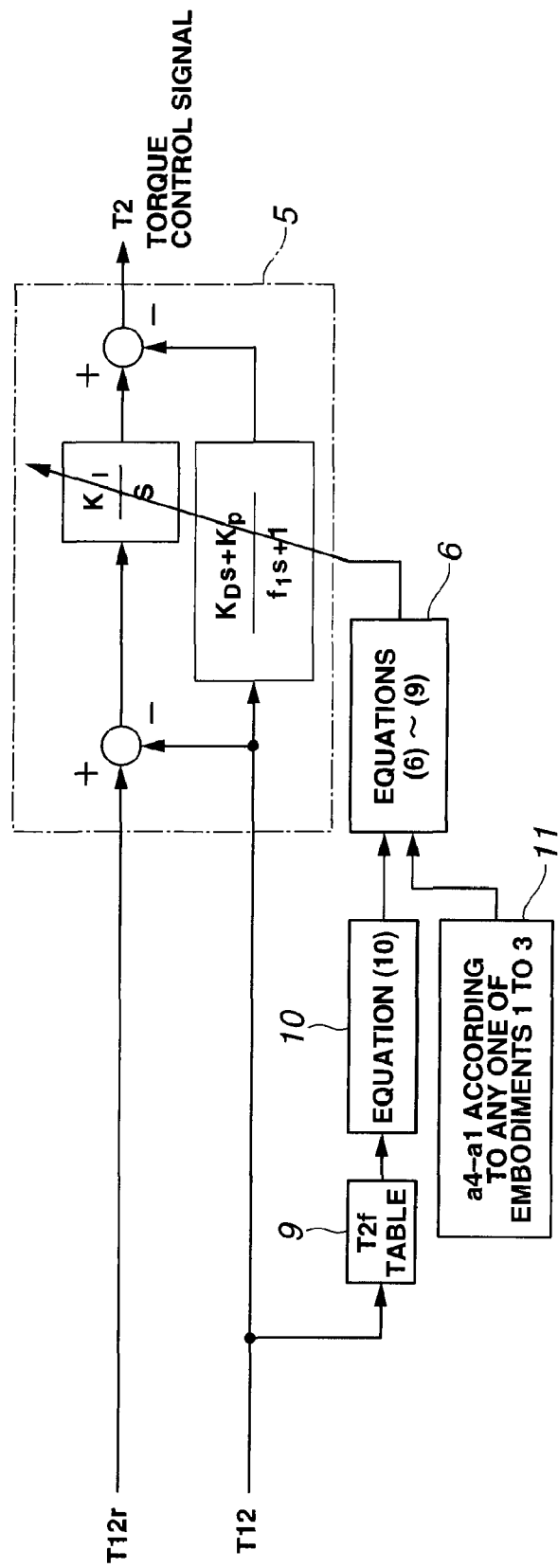
FIG. 10 is a control circuit block diagram of a major part of a dynamometer, showing a fifth embodiment of the present invention.

FIG. 10 shows a control circuit diagram of a major part of a dynamometer according to the fifth embodiment, in which the mechanical system is omitted. In this embodiment, the circuit configuration according to the fourth embodiment is modified by using the measured shaft torque (T12) as an input signal to the T2f table 9.

The present embodiment produces the same effects as the fourth embodiment. Particularly, the present embodiment can set the mechanical resonance frequency outputted from the T2f table to be close to an actual mechanical resonance frequency, because the measured shaft torque T12 is used as an input to the T2f table 9. Accordingly, as compared to the fourth embodiment, the control parameters calculated in equations (6) through (9) conform better to the mechanical characteristics. As a result, a control can be achieved in which quick response is maintained as in the first embodiment.

Embodiment 6

Figure 11:
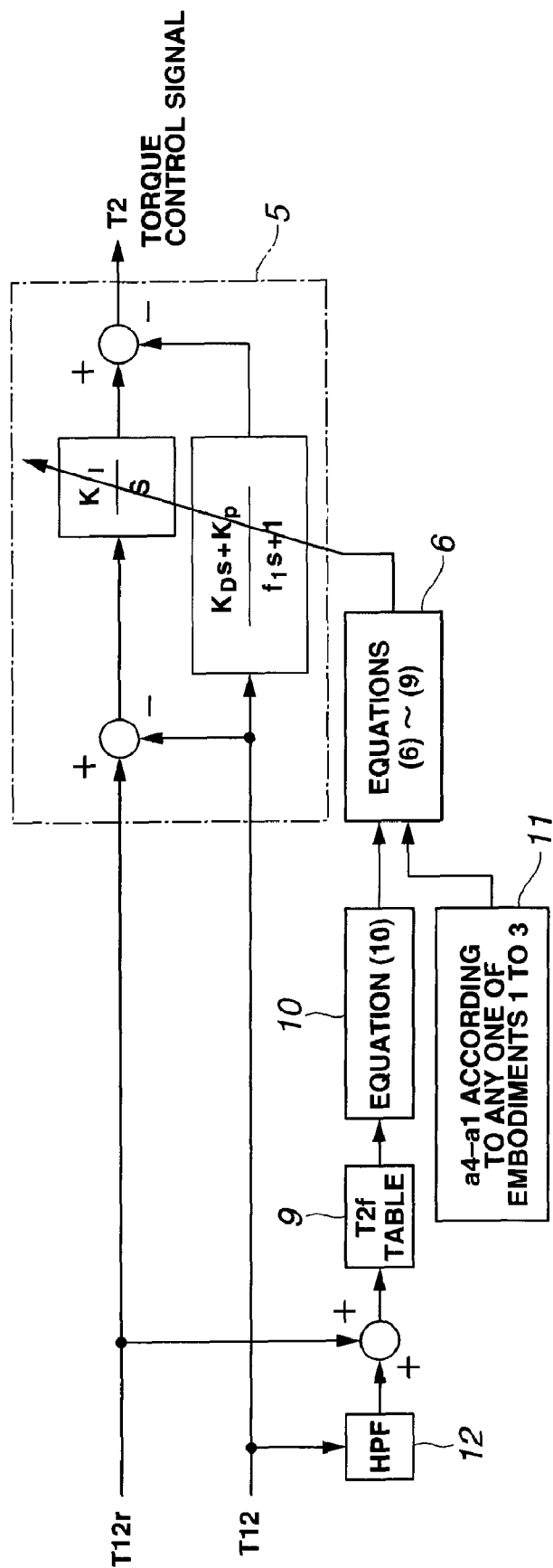
FIG. 11 is a control circuit block diagram of a major part of a dynamometer, showing a sixth embodiment of the present invention.

FIG. 11 shows a control circuit block diagram of a major part of a dynamometer according to the sixth embodiment, in which the mechanical system is omitted. In this embodiment, the circuit configuration in the fourth embodiment is modified so that the input signal to the T2f table has a value of the sum of the shaft torque command value (T12r) and a measured value that is obtained by applying the measured shaft torque (T12) with a high pass filter (HPF) 12.

The present embodiment produces the same effect as the fifth embodiment.

Embodiment 7

Figure 12:
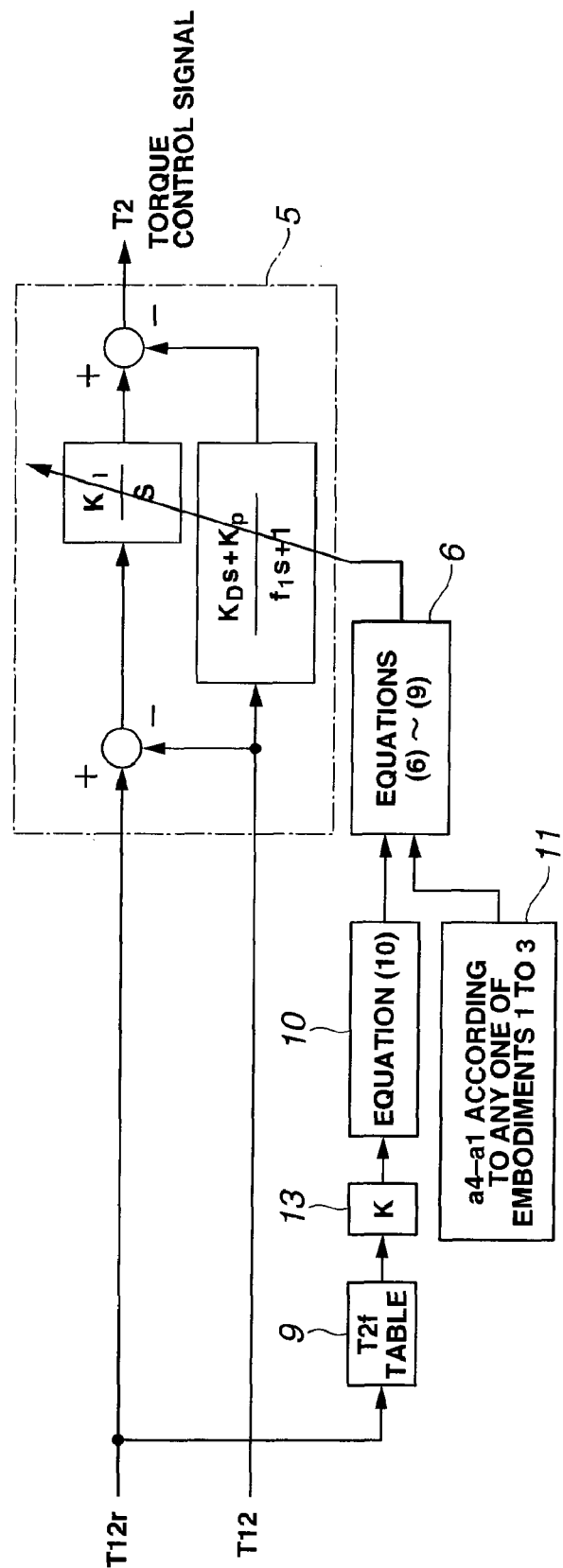
FIG. 12 is a control circuit block diagram of a major part of a dynamometer, showing a seventh embodiment of the present invention.
Figure 13:
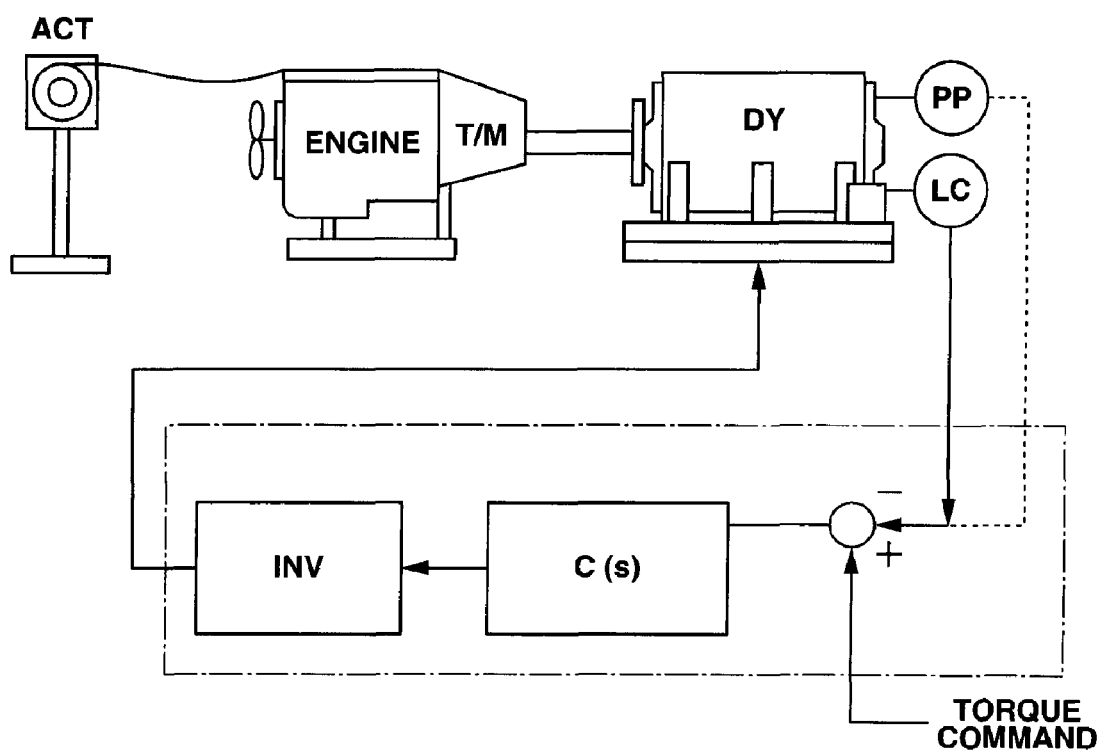
FIG. 13 is a configuration diagram of an engine bench system.

FIG. 12 shows a control circuit block diagram of a major part of a dynamometer according to the seventh embodiment, in which the mechanical system is omitted. In the seventh embodiment, the resonant frequency $\omega_c$ found in the Ta2f table 9 according to the fourth embodiment is multiplied by a gain K ($0<K\leq 1$) through a scale multiplier 13, and this multiplied value is used for calculation of equation (10). The input to the T2f table 9 may be modified as in the fifth embodiment or sixth embodiment.

In this embodiment, the inserted gain K ($0<K\leq 1$) produces an effect that the spring rigidity K12 assumed in equations (6) through (9) for calculation of control gains is deceptively smaller than the spring rigidity of the actual mechanical system. Accordingly, even if the estimated mechanical resonance frequency outputted from the T2f table is higher than an actual mechanical system resonance frequency due to some reasons, the same effects as first embodiment can be obtained in the fourth, fifth, and sixth embodiments.

As described hereinabove, the present invention is implemented by: expressing an engine bench system as a two-inertia mechanical system model; obtaining a fourth-order polynomial as a closed-loop characteristic polynomial of the motion equations of this mechanical system model and the transfer function of a controller; arbitrarily setting or determining each coefficient of the transfer function of the controller by four parameters ($K_I$, $K_P$, $K_D$, $f_1$); and further determining a spring rigidity K12 on a basis of a resonance frequency appearing in the mechanical model. This produces a resonance suppression effect, and allows a stable control even in a case where the spring rigidity of the shaft significantly varies.

The invention claimed is:

1. An engine bench system control system for an engine bench system in which an engine to be tested and a dynamometer are coupled together by a coupling shaft, and various kinds of characteristics of the engine are measured through a shaft torque control of the dynamometer, the engine bench system control system comprising:
a controller that performs the shaft torque control of the dynamometer on a basis of a shaft torque command and a measured shaft torque of the dynamometer, with a transfer function expressed by the following equation, $$T2 = \frac{K_I}{s}(T12r - T12) - \frac{K_D s + K_P}{f_1 s + 1}T12,$$

wherein T2 denotes a torque control signal, T12r denotes the shaft torque command, T12 denotes the measured shaft torque, $K_I$, $K_D$, $K_P$, and $f_1$ denote parameters, and s denotes a Laplace operator.

2. The engine bench system control system as claimed in claim 1, further comprising a function calculation section that determines the parameters on a basis of estimated controlled object parameters and set control characteristic parameters, using with the following equation:

$K_I = fK_I(a4,a3,a2,a1,J1,K12,J2)$ $K_P = fK_P(a4,a3,a2,a1,J1,K12,J2)$ $K_D = fK_D(a4,a3,a2,a1,J1,K12,J2)$ and $K_1 = fK_1(a4,a3,a2,a1,J1,K12,J2)$, wherein $fK_I$, $fK_P$, $fK_D$ and $fK_1$ denote functions, a4, a3, a2 and a1 denote the set control characteristic parameters, J1 denotes an engine inertia moment, J2 denotes a dynamometer inertia moment, and K12 denotes a spring rigidity of the coupling shaft.

3. The engine bench system control system as claimed in claim 1, further comprising a parameter setter that sets control characteristic parameters to a binomial coefficient type or Butterworth type.

4. The engine bench system control system as claimed in claim 1, further comprising a parameter calculation section that sets control characteristic parameters to coefficients of a product of a characteristic polynomial of a two inertia mechanical system having a resonance characteristic and a characteristic polynomial of a second-order low pass filter.

5. The engine bench system control system as claimed in claim 1, further comprising a parameter calculation section that sets control characteristic parameters to coefficients of a product of a characteristic polynomial of a two inertia system having a first resonance characteristic and a characteristic polynomial of a two inertia system having a second resonance characteristic.

6. The engine bench system control system as claimed in claim 1, further comprising a spring rigidity calculation section that sets the spring rigidity into a function calculation section, wherein the spring rigidity is calculated using the following equation with reference to the engine inertia moment denoted by J1, the dynamometer inertia moment denoted by J2, and a resonance frequency denoted by $\omega_c$ that is obtained from a table that stores data about a system resonance frequency that varies in accordance with a magnitude of the shaft torque command, $K12 = J1 \times J2 \times \omega_c^2/(J1+J2)$.

7. The engine bench system control system as claimed in claim 6, further comprising a scale multiplier that multiplies by a gain the resonance frequency derived from the table, and inputs the multiplied resonance frequency into the spring rigidity calculation section, wherein the gain is larger than zero and smaller than or equal to one.

8. The engine bench system control system as claimed in claim 2, further comprising a scale multiplier that multiplies by a gain the resonance frequency derived from the table, and inputs the multiplied resonance frequency into the spring rigidity calculation section, wherein the gain is larger than zero and smaller than or equal to one.

9. The engine bench system control system as claimed in claim 1, further comprising a spring rigidity calculation section that sets the spring rigidity into a function calculation section, wherein the spring rigidity is calculated using the following equation with reference to an engine inertia moment denoted by J1, the dynamometer inertia moment denoted by J2, and a resonance frequency denoted by $\omega_c$ that is obtained from a table that stores data about a system resonance frequency that varies in accordance with a magnitude of a sum of the shaft torque command and a measured value that is obtained by applying the measured shaft torque with a high pass filter, $$K12=J1 \times J2 \times \omega_c^2/(J1+J2).$$

10. The engine bench system control system as claimed in claim 1, further comprising a spring rigidity calculation section that sets a spring rigidity into the function calculation section, wherein the spring rigidity is calculated using the following equation with reference to an engine inertia moment denoted by J1, a dynamometer inertia moment denoted by J2, and a resonance frequency denoted by $\omega_c$ that is obtained from a table that stores data about a system resonance frequency that varies in accordance with a magnitude of the measured shaft torque, $$K12=J1 \times J2 \times \omega_c^2/(J1+J2).$$

11. The engine bench system control system as claimed in claim 10, further comprising a scale multiplier that multiplies by a gain the resonance frequency derived from the table, and inputs the multiplied resonance frequency into the spring rigidity calculation section, wherein the gain is larger than zero and smaller than or equal to one.

12. The engine bench system control system as claimed in claim 1, further comprising a parameter setter that sets control characteristic parameters to a binomial coefficient type or Butterworth type.

13. The engine bench system control system as claimed in claim 1, further comprising a parameter calculation section that sets control characteristic parameters to coefficients of a product of a characteristic polynomial of a two inertia mechanical system having a resonance characteristic and a characteristic polynomial of a second-order low pass filter.

14. The engine bench system control system as claimed in claim 1, further comprising a parameter calculation section that sets control characteristic parameters to coefficients of a product of a characteristic polynomial of a two inertia system having a first resonance characteristic and a characteristic polynomial of a two inertia system having a second resonance characteristic.

15. The engine bench system control system as claimed in claim 1, further comprising a spring rigidity calculation section that sets a spring rigidity into a function calculation section, wherein the spring rigidity is calculated using the following equation with reference to an engine inertia moment denoted by J1, a dynamometer inertia moment denoted by J2, and a resonance frequency denoted by $\omega_c$ that is obtained from a table that stores data about a system resonance frequency that varies in accordance with a magnitude of the shaft torque command, $$K12=J1 \times J2 \times \omega_c^2/(J1+J2).$$

16. The engine bench system control system as claimed in claim 1, further comprising a spring rigidity calculation section that sets a spring rigidity into the function calculation section, wherein the spring rigidity is calculated using the following equation with reference to an engine inertia moment denoted by J1, a dynamometer inertia moment denoted by J2, and a resonance frequency denoted by $\omega_c$ that is obtained from a table that stores data about a system resonance frequency that varies in accordance with a magnitude of a sum of the shaft torque command and a measured value that is obtained by applying the measured shaft torque with a high pass filter, $$K12=J1 \times J2 \times \omega_c^2/(J1+J2).$$

17. The engine bench system control system as claimed in claim 1, further comprising a spring rigidity calculation section that sets a spring rigidity into a function calculation section, wherein the spring rigidity is calculated using the following equation with reference to an engine inertia moment denoted by J1, a dynamometer inertia moment denoted by J2, and a resonance frequency denoted by $\omega_c$ that is obtained from a table that stores data about a system resonance frequency that varies in accordance with a magnitude of the measured shaft torque, $$K12=J1 \times J2 \times \omega_c^2/(J1+J2).$$

18. The engine bench system control system as claimed in claim 1, further comprising a spring rigidity calculation section that sets a spring rigidity into the function calculation section, wherein the spring rigidity is calculated using the following equation with reference to an engine inertia moment denoted by J1, a dynamometer inertia moment denoted by J2, and a resonance frequency denoted by $\omega_c$ that is obtained from a table that stores data about a system resonance frequency that varies in accordance with a magnitude of the measured shaft torque, $$K12=J1 \times J2 \times \omega_c^2/(J1+J2).$$

19. The engine bench system control system as claimed in claim 1, further comprising a spring rigidity calculation section that sets a spring rigidity into a function calculation section, wherein the spring rigidity is calculated using the following equation with reference to an engine inertia moment denoted by J1, a dynamometer inertia moment denoted by J2, and a resonance frequency denoted by $\omega_c$ that is obtained from a table that stores data about a system resonance frequency that varies in accordance with a magnitude of a sum of the shaft torque command and a measured value that is obtained by applying the measured shaft torque with a high pass filter, $$K12=J1 \times J2 \times \omega_c^2/(J1+J2).$$

20. The engine bench system control system as claimed in claim 19, further comprising a scale multiplier that multiplies by a gain the resonance frequency derived from the table, and inputs the multiplied resonance frequency into the spring rigidity calculation section, wherein the gain is larger than zero and smaller than or equal to one.

* * * * *